United States Patent
Nishimura et al.

(10) Patent No.: US 9,122,268 B2
(45) Date of Patent: Sep. 1, 2015

(54) MONITORING METHOD AND MONITOR APPARATUS FOR MONITORING ROTATION SPEED OF ROTARY SHAFT IN MACHINE TOOL, AND MACHINE TOOL

(75) Inventors: Kohei Nishimura, Niwa-Gun (JP); Kiyoshi Yoshino, Niwa-Gun (JP); Hajimu Ishii, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 748 days.

(21) Appl. No.: 13/459,759

(22) Filed: Apr. 30, 2012

(65) Prior Publication Data
US 2013/0073251 A1 Mar. 21, 2013

(30) Foreign Application Priority Data
Sep. 20, 2011 (JP) ................... 2011-204676

(51) Int. Cl.
*G01P 3/00* (2006.01)
*G05B 19/4062* (2006.01)

(52) U.S. Cl.
CPC .. *G05B 19/4062* (2013.01); *G05B 2219/41256* (2013.01)

(58) Field of Classification Search
CPC ....... G06F 15/00; B60K 28/16; G01M 1/045; G01M 1/225; H02P 25/145
See application file for complete search history.

(56) References Cited

U.S. PATENT DOCUMENTS

| 4,193,305 | A | * | 3/1980 | Hunter | 73/462 |
| 5,056,237 | A | * | 10/1991 | Saunders | 33/645 |
| 2012/0097411 | A1 | * | 4/2012 | Yoshino et al. | 173/176 |

FOREIGN PATENT DOCUMENTS

| JP | 49-105277 A1 | 10/1974 |
| JP | 2000-126991 A1 | 5/2000 |

* cited by examiner

*Primary Examiner* — Elias Desta
(74) *Attorney, Agent, or Firm* — Burr & Brown, PLLC (57) ABSTRACT

When a rotation speed is fluctuated, a fluctuation diagram showing the relationship between a fluctuation amplitude and a fluctuation period of the rotation speed is displayed on a monitor. In addition to a current setting value, a settable range of the fluctuation amplitude and the fluctuation period is displayed on the fluctuation diagram. At least one of an optimal fluctuation period $P_O$ based on Equation (1) below and an optimal range $P_l$ of the fluctuation period based on Equation (2) below is also displayed on the fluctuation diagram, wherein T is a rotation period of a rotary shaft, and a, $a_{min}$, $a_{max}$ are preset coefficients.

$$P_O = aT \qquad (1)$$

$$a_{min}T \le P_l \le a_{max}T \qquad (2)$$

12 Claims, 6 Drawing Sheets

MONITORING METHOD AND MONITOR APPARATUS FOR MONITORING ROTATION SPEED OF ROTARY SHAFT IN MACHINE TOOL, AND MACHINE TOOL

CROSS-REFERENCE TO RELATED APPLICATION

This application claims the benefit of Japanese Patent Application Number 2011-204676 filed on Sep. 20, 2011, the entirety of which is incorporated by reference.

BACKGROUND OF THE INVENTION

1. Field of the Invention

The present invention relates to a monitoring method and a monitor apparatus for monitoring, in a machine tool including a rotary shaft that is mounted with a tool or a workpiece and driven by a motor, and a rotation speed fluctuating unit that continuously fluctuates a rotation speed of the rotary shaft at an arbitrary pattern, a fluctuating condition of the rotation speed caused by the rotation speed fluctuating unit on a display section, and also relates to a machine tool equipped with the monitor apparatus.

2. Description of Related Art

When machining a workpiece with low rigidity using a machine tool or during machining that uses a tool with low rigidity, sharp vibration known as chatter vibration often occurs during cutting. Chatter vibration produces a cyclical pattern generally known as a chatter mark on the machined surface, and causes degradation of the finished surface texture and machining accuracy, Cyclic fluctuations in cutting force cause noise, which may lead to problems such as tool wear and loss.

As a method for suppressing chatter vibration, Japanese Patent Application Publication No. 49-105277 (JP 49-105277 A) describes art that fluctuates a rotation speed of a rotary shaft. Japanese Patent Application Publication No. 2000-126991 (JP 2000-126991 A) also describes an invention that enables easy operation of a control device when chatter vibration occurs by displaying a control screen for fluctuating rotation speed and allowing input per tool of a fluctuation range and fluctuation degree of the rotation speed. A previous patent application (Japanese Patent Application No. 2010-235720) filed by the applicant of the present application provides an invention that displays parameter values having an effect on regenerative chatter vibration during cutting at fluctuating rotation speeds, and enables simple setting of the parameters.

In the past, however, even if a fluctuation period is set to a minimum value within a range of operation shown to have an effect on chatter vibration as mentioned above when periodically fluctuating the rotation speed of the rotary shaft, it was not always possible to minimize chatter vibration depending on the rotation speed. Therefore, the operator could not always accurately know the optimal fluctuation period for suppressing chatter vibration, and finding the optimal parameters often took time.

SUMMARY OF THE INVENTION

The present invention was devised to solve the foregoing problems, and it is an object of the present invention to provide a monitoring method and a monitor apparatus for monitoring a rotation speed of a rotary shaft in a machine tool by displaying an optimal fluctuation period for suppressing chatter vibration regardless of the rotation speed of the rotary shaft and enabling easy setting of optimal parameters in a short time, and also provides a machine tool.

To achieve the above object, a first aspect of the present invention is a monitoring method for monitoring, in a machine tool including a rotary shaft that is mounted with a tool or a workpiece and driven by a motor, and a rotation speed fluctuating unit that continuously fluctuates a rotation speed of the rotary shaft at an arbitrary pattern, a fluctuating condition of the rotation speed caused by the rotation speed fluctuating unit on a display section. The monitoring method includes the steps of displaying a fluctuation diagram that shows the relationship between a fluctuation amplitude and a fluctuation period for the rotation speed on the display section, displaying a current fluctuation position on the fluctuation diagram, displaying a settable range for the fluctuation amplitude and the fluctuation period on the fluctuation diagram, and displaying on the fluctuation diagram at least one of an optimal fluctuation period based on Equation (1) and an optimal range of the fluctuation period based on Equation (2), wherein $$P_O = aT \tag{1}$$

and $$a_{min}T \le P_1 \le a_{max}T \tag{2}$$

where,
$P_O$: optimal fluctuation period [s],
$P_1$: optimal range of fluctuation period [s],
T: rotation period of rotary shaft [s], and
a, $a_{min}$, $a_{max}$: preset coefficients.

According to a second aspect of the present invention, in the configuration of the first aspect, at the settable range display step, a range enclosed by a power limit line of the motor for the fluctuation period and a preset upper limit line for the fluctuation amplitude is displayed as the settable range for the fluctuation amplitude and the fluctuation period.

According to a third aspect of the present invention, the configuration of the first or second aspect further includes the step of displaying a guidance display that guides the current fluctuation position displayed at the current fluctuation position display step to one of the optimal fluctuation period and the optimal range if the current fluctuation position is different from one of the optimal fluctuation period and the optimal range displayed at the optimal fluctuation period and optimal range display step.

To achieve the above object, a fourth aspect of the present invention is a monitor apparatus for monitoring, in a machine tool including a rotary shaft that is mounted with a tool or a workpiece and driven by a motor, and a rotation speed fluctuating unit that continuously fluctuates a rotation speed of the rotary shaft at an arbitrary pattern, a fluctuating condition of the rotation speed caused by the rotation speed fluctuating unit on a display section. The monitor apparatus includes a fluctuation diagram display unit that displays a fluctuation diagram that shows the relationship between a fluctuation amplitude and a fluctuation period for the rotation speed on the display section, a current fluctuation position display unit that displays a current fluctuation position on the fluctuation diagram, a settable range display unit that displays a settable range for the fluctuation amplitude and the fluctuation period on the fluctuation diagram, and an optimal fluctuation period and optimal range display unit that displays on the fluctuation diagram at least one of an optimal fluctuation period based on Equation (1) and an optimal range of the fluctuation period based on Equation (2), wherein $$P_O = aT \qquad (1)$$

and $$a_{min}T \le P_1 \le a_{max}T \qquad (2)$$

where,
$P_O$: optimal fluctuation period [s],
$P_1$: optimal range of fluctuation period [s],
T: rotation period of rotary shaft [s], and
a, $a_{min}$, $a_{max}$: preset coefficients.

According to a fifth aspect of the present invention, in the configuration of the fourth aspect, the settable range display unit displays a range enclosed by a power limit line of the motor for the fluctuation period and a preset upper limit line for the fluctuation amplitude as the settable range for the fluctuation amplitude and the fluctuation period.

According to a sixth aspect of the present invention, the configuration of the fourth or fifth aspect further includes a guidance display unit that displays a guidance display that guides the current fluctuation position displayed by the current fluctuation position display unit to one of the optimal fluctuation period and the optimal range if the current fluctuation position is different from one of the optimal fluctuation period and the optimal range displayed by the optimal fluctuation period and optimal range display unit.

To achieve the above object, a seventh aspect of the present invention is a machine tool including a rotary shaft that is mounted with a tool or a workpiece and driven by a motor, a rotation speed fluctuating unit that continuously fluctuates a rotation speed of the rotary shaft at an arbitrary pattern, and the monitor apparatus according to any one of the fourth to sixth aspects.

According to the first, fourth, and seventh aspects of the present invention, based on the display on the display section, the operator can quickly and efficiently find a fluctuation cutting parameter with a high chatter vibration suppressing effect during cutting at any rotation speed. Moreover, the fluctuation amplitude and the fluctuation period of the rotation speed of the rotary shaft can be changed using optimal parameters.

According to the second and fifth aspects of the present invention, in addition to the effects described above, an appropriate settable range that considers the maximum power of the motor can be selected.

According to the third and sixth aspects of the present invention, in addition to the effects described above, the operator can easily recognize the order for changing to parameters with a high chatter vibration suppressing effect.

DETAILED DESCRIPTION OF THE INVENTION

Hereinafter, an embodiment of the present invention will be described on the basis of the drawings.

Figure 1:
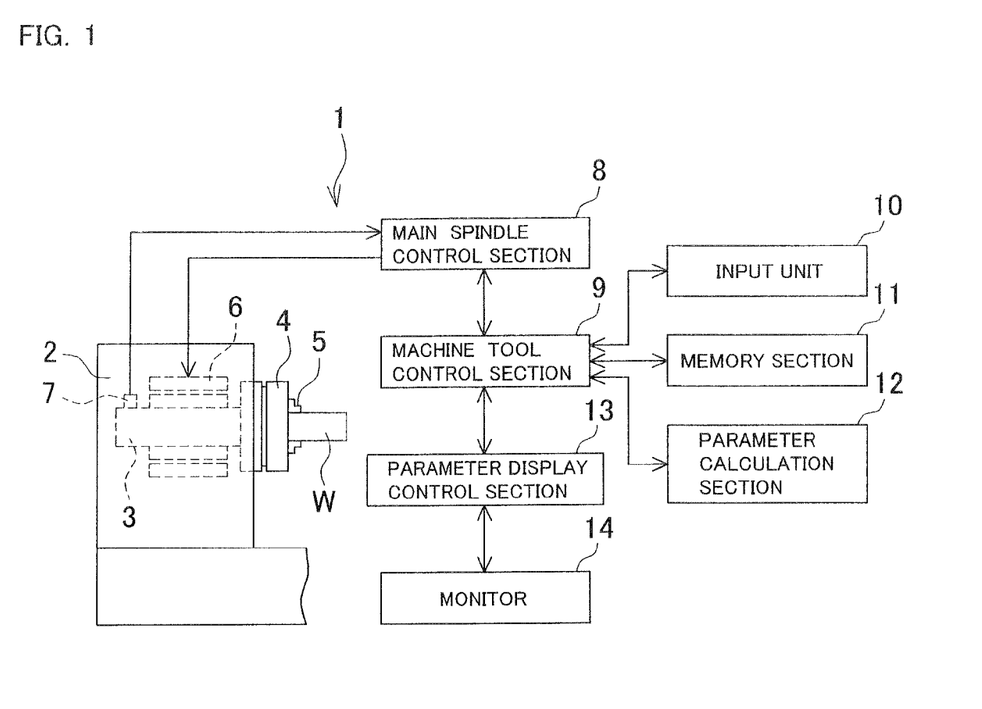
FIG. 1 is a schematic configuration diagram of an NC lathe.

FIG. 1 is a schematic configuration diagram of an NC lathe 1 that is an example of a machine tool. In the NC lathe 1, a headstock 2 rotatably supports a main spindle 3. The main spindle 3 serves as a rotary shaft that holds a workpiece W through a chuck 4 and claws 5. A motor 6 that rotatingly drives the main spindle 3, and an encoder 7 that is fixed to the headstock 2 and detects a rotation speed of the main spindle 3 are built into the headstock 2.

Reference numeral 8 denotes a main spindle control section that is connected to the motor 6 and the encoder 7. Reference numeral 9 denotes a machine tool control section that instructs a rotation speed to the main spindle control section 8. The main spindle control section 8 constantly monitors the detected rotation speed of the main spindle 3 from the encoder 7, and also adjusts the power supplied to the motor 6 such that the main spindle 3 rotates at the rotation speed instructed by the machine tool control section 9.

The machine tool control section 9 is connected to an input unit 10 for instructing a change in rotation speed or the like, a memory section 11 that stores machining programs and the like, a parameter calculation section 12 that calculates optimal parameters for suppressing chatter vibration, and a parameter display control section 13 that displays the parameters calculated by the parameter calculation section 12 and a fluctuation diagram described later on a monitor 14 that is a display section. The machine tool control section 9 has a known configuration for performing a cutting process in which a tool fixed to a tool rest (not shown) cuts the workpiece W as the main spindle 3 rotates, and moves the tool rest in the radial direction or the lengthwise direction.

Figure 2:
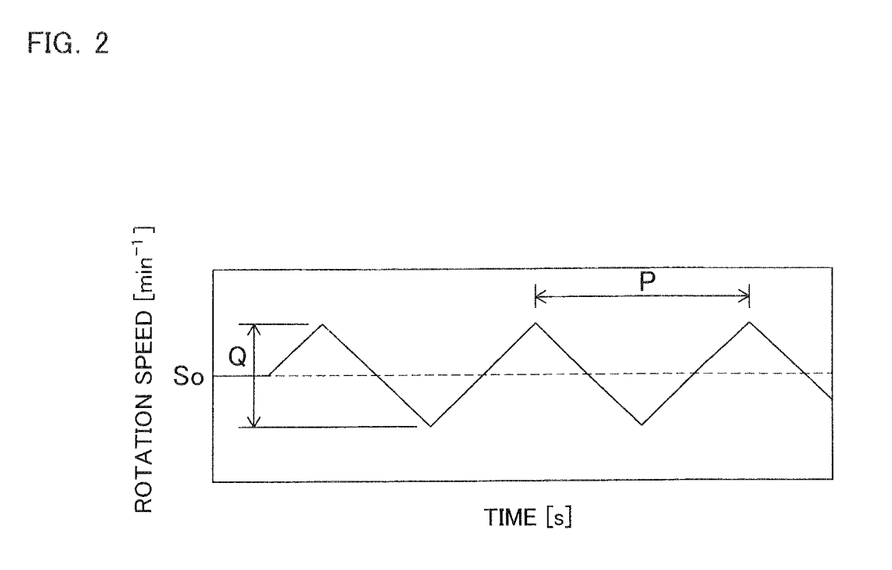
FIG. 2 is an explanatory diagram that shows an example of fluctuating a main spindle rotation speed.

Based on the rotation speed of the main spindle 3, and a fluctuation amplitude and a fluctuation period of the main spindle 3, which are respectively input using the input unit 10, the machine tool control section 9 can fluctuate the rotation speed of the main spindle 3 according to the specified fluctuation amplitude and fluctuation period as shown in FIG. 2. In other words, the machine tool control section 9 functions as a rotation speed fluctuating unit.

Figure 3:
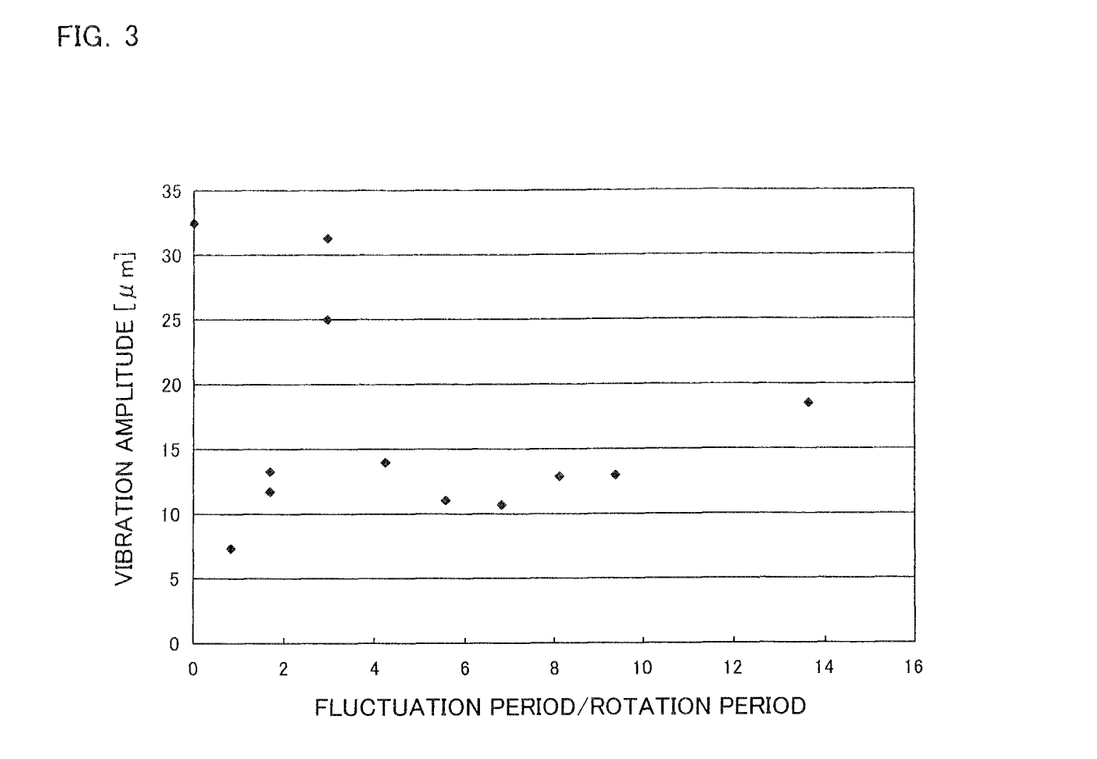
FIG. 3 is a graph of test results.

An optimal fluctuation period, which is for suppressing chatter vibration during cutting while fluctuating the main spindle rotation speed, can be found through a cutting test. For example, the optimal fluctuation period that minimizes vibration may be found by cutting the workpiece W fixed to the main spindle 3 with a boring bar, while measuring the vibration during cutting with a vibrometer placed on the boring bar and fluctuating the fluctuation period through the input unit 10. FIG. 3 is a diagram that shows the relationship between the fluctuation period found through testing and the magnitude of chatter vibration. If T is a rotation period of the main spindle 3, an optimal fluctuation period $P_O$ can be expressed as shown in Equation (1) below. Note that a may be a coefficient empirically found by an instrument in the cutting test described above, for example.

$$P_O = aT \qquad (1)$$

where,
$P_O$: optimal fluctuation period [s], and
T: main spindle rotation period [s].

Next, a display on the monitor 14 generated by the parameter display control section 13, which is an essential portion of the present invention, will be described. The parameter display control section 13 functions as a fluctuation diagram display unit, a current fluctuation position display unit, a settable range display unit, an optimal fluctuation period and optimal range display unit, and a guidance display unit. The parameter display control section 13 together with the monitor 14 forms a monitor apparatus of the present invention.

First, in the NC lathe 1, time-domain vibration during machining is detected by a vibration sensor (not shown) placed on the tool, and whether chatter vibration occurs is monitored. A waveform from the vibration sensor is displayed in real time on the monitor 14 so that the occurrence of chatter vibration can be recognized.

Figure 4:
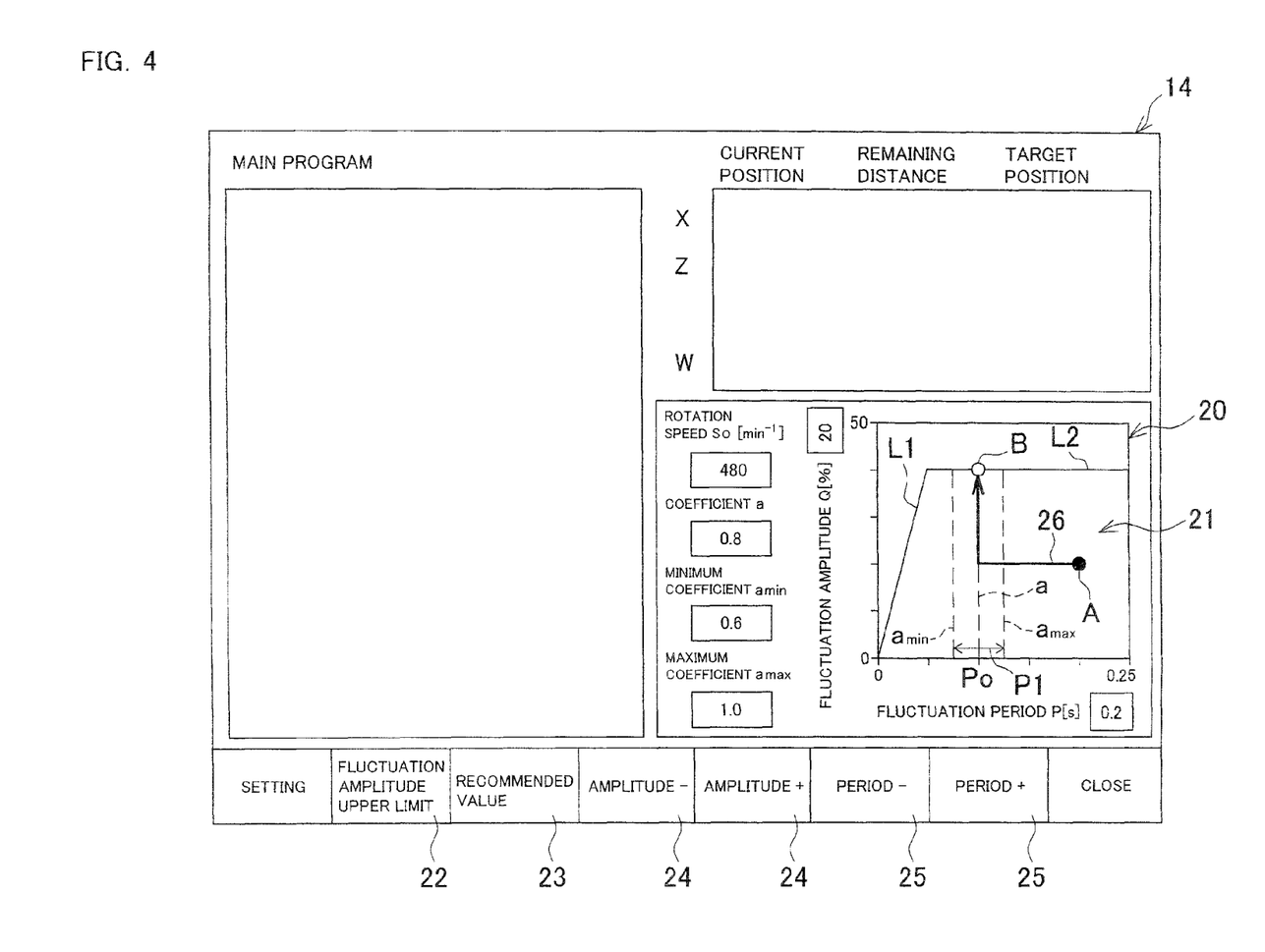
FIG. 4 is an explanatory diagram that shows an example of a display on a monitor.

If chatter vibration is confirmed, based on an instruction made through the input unit 10, a fluctuation diagram 20 is displayed on the monitor 14 in addition to a main program and a basic display such as the current position of the main spindle 3 (fluctuation diagram display step). As shown in FIG. 4, the vertical axis of the fluctuation diagram 20 indicates a fluctuation amplitude Q and the horizontal axis indicates a fluctuation period P. Here, displayed as the parameters are a reference rotation speed $S_O$, the fluctuation amplitude Q, the fluctuation period P, the coefficient a for finding the optimal fluctuation period, a minimum coefficient $a_{min}$, and a maximum coefficient $a_{max}$. In addition, a power limit line L1 of the motor 6, and an upper limit line L2 of the fluctuation amplitude Q are displayed on the fluctuation diagram 20 (settable range display step). A lower area enclosed by the power limit line L1 and the upper limit line L2 of the fluctuation amplitude Q corresponds to a settable range 21 of the parameters.

Accordingly, the operator can input predetermined parameters if chatter vibration occurs to fluctuate the rotation speed of the main spindle 3 based on the fluctuation amplitude Q and the fluctuation period P corresponding to the parameter values. In such case, a setting value A that indicates the current fluctuation position is displayed as a black circle on the fluctuation diagram 20 (current fluctuation position display step).

It should be noted that an upper limit for input power is specified for input power because an excessive current would heat up and damage the motor 6. Therefore, even if the fluctuation amplitude Q of the rotation speed is set large and the fluctuation period P is set low, it may not be possible to fluctuate the rotation speed with the set values. Thus, using Equation (3) below, for example, the parameter display control section 13 calculates and displays a limit line for the fluctuation amplitude Q and the fluctuation period P at which the rotation speed can be fluctuated based on the maximum input power of the motor 6, i.e., the power limit line L1 for the fluctuation period P. Meanwhile, the upper limit of the fluctuation amplitude Q can be input on an input screen (not shown) that appears by pressing an upper limit setting button 22 displayed at the bottom of the monitor 14.

$$Q = \frac{45000}{\pi^2 S^2 J}(E - Ec)P \quad (3)$$

where,
Q: fluctuation amplitude [%],
S: main spindle rotation speed [$min^{-1}$],
E: motor maximum input power [W],
P: fluctuation period [s],
J: main spindle inertia [$kg \cdot m^2$], and
Ec: sum of cutting power and power loss [W].

In the fluctuation diagram 20 of FIG. 4, to suppress regenerative chatter vibration, the optimal fluctuation period $P_O$ calculated from the preset coefficient a and Equation (1), and an optimal range $P_1$ of the fluctuation period calculated in Equation (2) below using the coefficients $a_{min}$, $a_{max}$ and the main spindle rotation period T are displayed together (optimal fluctuation period and optimal range display step).

$$a_{min}T < P_1 < a_{max}T \quad (2)$$

Here, the optimal parameters for suppressing chatter vibration are plotted with a white circle as a recommended value B. At the recommended value B, the fluctuation period P corresponds to the optimal fluctuation period $P_O$ found by Equation (1), and the fluctuation amplitude Q corresponds to the maximum value of the parameter settable range 21. By pressing a recommended value setting button 23 displayed at the bottom of the monitor 14, the parameters can be instantly changed to the recommended value B.

Note that, if chatter vibration cannot be suppressed even after using the parameters set with the recommended value setting button 23, the fluctuation period P can be adjusted within the range of $a_{min}T < P_1 < a_{max}T$ while watching the waveform of the vibration sensor to set the fluctuation period P with the least chatter vibration. Thus, a chatter vibration suppressing effect can be maximized after brief adjustment. At the bottom of the monitor 14, adjustment buttons 24, 24 for the fluctuation amplitude Q and adjustment buttons 25, 25 for the fluctuation period P are displayed.

However, if an excessively large fluctuation amplitude Q is used, the cutting speeds at low speed and high speed will differ from the recommended cutting speeds of the tool. Therefore, the fluctuation amplitude Q is preferably the smallest value possible in the range where chatter vibration can be suppressed. Accordingly, if the current setting value A is not included in the optimal range $P_1$, based on an instruction input through the input unit 10 and as shown in FIG. 4, a guidance arrow 26 is displayed as a guidance display (guidance display step). The guidance arrow 26 originates from the current setting value A, and consists of a horizontal line leading only the fluctuation period P to the optimal fluctuation period $P_O$ and a vertical line that leads the fluctuation amplitude Q from there to the upper limit set as the recommended value B. Using the guidance arrow 26, the operator can be first encouraged to change from the current setting value A to the optimal fluctuation period $P_O$, and if this does not achieve a chatter vibration suppressing effect, the operator can be next encouraged to change to the upper limit of the fluctuation amplitude Q (here, the recommended value B).

Figure 5:
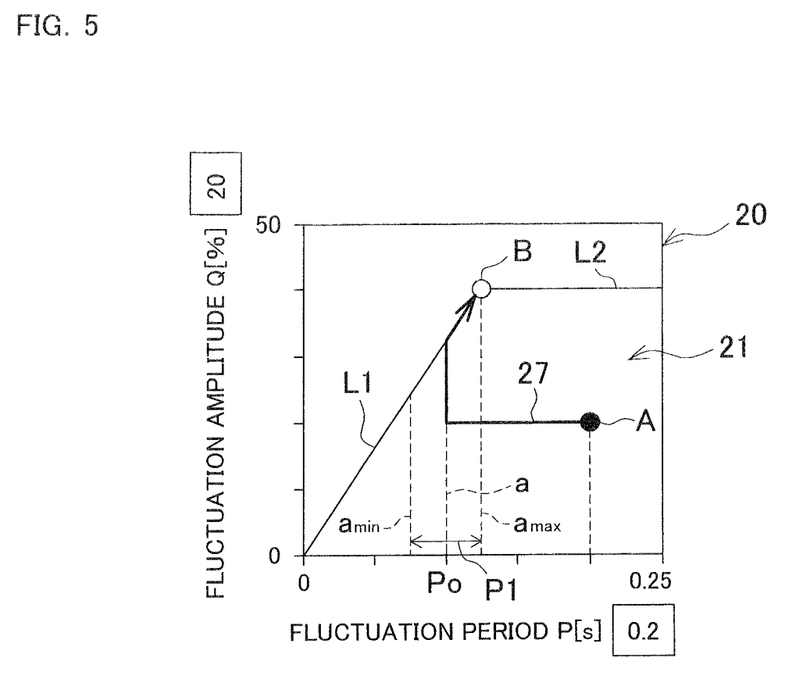
FIG. 5 is an explanatory diagram that shows an example of another display of a fluctuation diagram.
Figure 6:
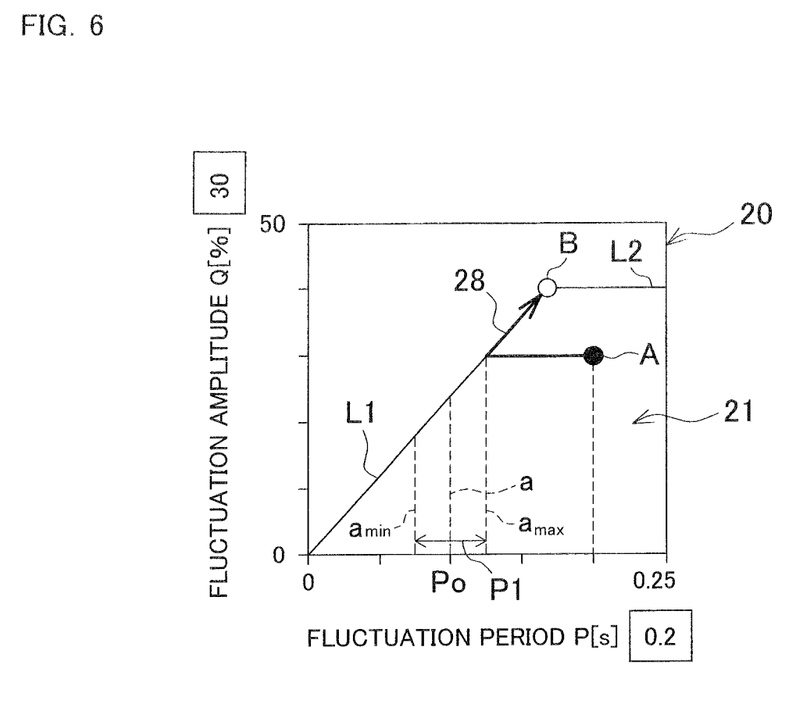
FIG. 6 is an explanatory diagram that shows an example of yet another display of the fluctuation diagram.

Likewise, in the fluctuation diagrams 20 shown in FIGS. 5 and 6, when the power limit line L1 and the optimal range $P_1$ of the fluctuation period P within the parameter settable range 21 intersect, the recommended value B and the guidance arrow 26 that indicates the parameter changing order are respectively shown. The chatter vibration suppressing effect grows as the fluctuation amplitude Q increases under a condition of fixed power consumption by the motor 6. Thus, in FIG. 5, a guidance arrow 26 is displayed consisting of a horizontal line that leads only the fluctuation period P to the optimal fluctuation period $P_O$ calculated from the coefficient a and Equation (1), a vertical line that leads the fluctuation amplitude Q from there to the power limit line L1 where the motor 6 is at maximum power to further increase the chatter vibration suppressing effect, and a diagonal line that leads the fluctuation amplitude Q to the recommended value B on the power limit line L1. Similarly in FIG. 6, a guidance arrow 26 is displayed consisting of a horizontal line that leads only the fluctuation period P to the optimal range $P_1$ and the power limit line L1, and a diagonal line that leads the fluctuation amplitude Q to the recommended value B on the power limit line L1.

Thus, according to the monitoring method and monitor apparatus of the NC lathe 1 of the embodiment described above, when chatter vibration occurs, the fluctuation diagram 20 showing the relationship between the fluctuation amplitude Q and the fluctuation period P for the rotation speed of the main spindle 3 is displayed on the monitor 14, so that the rotation speed can be continuously fluctuated at an arbitrary pattern. The current setting value A, and the settable range 21 of the fluctuation amplitude Q and the fluctuation period P are also displayed on the fluctuation diagram 20. In addition, the optimal fluctuation period $P_O$ based on Equation (1) and the optimal range $P_1$ of the fluctuation period P based on Equation (2) are displayed on the fluctuation diagram 20. Accordingly, based on the display on the monitor 14, the operator can quickly and efficiently find a fluctuation cutting parameter with a high chatter vibration suppressing effect during cutting at any rotation speed. Moreover, the fluctuation amplitude Q and the fluctuation period P for the rotation speed of the main spindle 3 can be changed using the optimal parameters.

It should be noted in particular here that the range enclosed by the power limit line L1 of the motor 6 for the fluctuation period P and the preset upper limit line L2 for the fluctuation amplitude Q is displayed as the settable range 21 of the fluctuation amplitude Q and the fluctuation period P. Therefore, an appropriate settable range that considers the maximum power of the motor 6 can be selected.

In addition, if the current setting value A is outside the optimal range $P_1$, the guidance arrows 26 to 28 leading the current setting value A to the optimal fluctuation period $P_O$ are displayed. Therefore, the operator can easily recognize the order for changing to parameters with a high chatter vibration suppressing effect.

Note that, in the embodiment described above, after the fluctuation diagram is displayed on the monitor and fluctuation of the main spindle is started, the power limit line, the upper limit line of the fluctuation amplitude, the optimal fluctuation period, and the optimal range are automatically displayed. However, these may be displayed at any individual timing using the input unit. Alternatively, a guidance display may also be automatically displayed. The fluctuation diagram is obviously not limited to the embodiment and content described above. Modifications such as reversing the axes or using a three-dimensional display are also conceivable.

In addition, although the optimal fluctuation period and the optimal range are simultaneously displayed on the fluctuation diagram here, either may be displayed alone.

Displays of the current setting value and the recommended value are not limited to circles. Markers of a different shape may be selected, or the shapes of the markers for the current setting value and the recommended value may differ from each other. The display of the settable range for the parameters may also be distinguished by other than lines. For example, differences in color or shading may be used instead. In addition, the guidance display is not limited to an arrow, and may be modified as appropriate provided that the guidance display suggests changing to a new fluctuation position. For example, the marker for the current fluctuation position may flash on and off while a display to move to a new fluctuation position is repeated. The guidance is also not limited to the recommended value, and may be simply guidance to either the optimal fluctuation period or the optimal range. Further note that the guidance display is not necessarily provided.

In the embodiment described above, the main spindle is first rotated at a set uniform speed. If chatter vibration is detected, the input unit is used to input the fluctuation amplitude and the fluctuation period for the rotation speed so as to fluctuate the rotation speed. However, the rotation speed may be fluctuated from the start.

The present invention is not limited to an NC lathe, and includes any machine tool that fluctuates the rotation speed when performing cutting work, e.g., a machining center that performs machining of workpieces by rotating a rotary shaft mounted with a tool.

What is claimed is:

1. A monitoring method for monitoring a rotation speed of a rotary shaft in a machine tool, the machine tool including the rotary shaft that is mounted with one of a tool and a workpiece and driven by a motor, and a rotation speed fluctuating unit that continuously fluctuates the rotation speed of the rotary shaft at an arbitrary pattern, and a fluctuating condition of the rotation speed caused by the rotation speed fluctuating unit is monitored on a display section, the monitoring method comprising steps of:

generating and displaying a fluctuation diagram that shows relationship between a fluctuation amplitude and a fluctuation period for the rotation speed on the display section;

displaying a current fluctuation position on the fluctuation diagram;

determining and displaying a settable range for the fluctuation amplitude and the fluctuation period on the fluctuation diagram;

determining and displaying on the fluctuation diagram at least one of an optimal fluctuation period based on Equation (1) and an optimal range of the fluctuation period based on Equation (2), wherein $$P_O = aT \qquad (1)$$

and $$a_{min}T \le P_f \le a_{max}T \qquad (2)$$

where, $P_O$: optimal fluctuation period [s],
$P_f$: optimal range of fluctuation period [s],
T: rotation period of rotary shaft [s], and
a, $a_{min}$, $a_{max}$: preset coefficients, and changing the fluctuation period of the rotary shaft to one of the optimal fluctuation period and a fluctuation period value within the optimal range of the fluctuation period to suppress regenerative chatter vibration.

2. The monitoring method for monitoring a rotation speed of a rotary shaft in a machine tool according to claim 1, wherein at the settable range display step, a range enclosed by a power limit line of the motor for the fluctuation period and a preset upper limit line for the fluctuation amplitude is displayed as the settable range for the fluctuation amplitude and the fluctuation period.

3. The monitoring method for monitoring a rotation speed of a rotary shaft in a machine tool according to claim 1, further comprising a step of:

displaying a guidance display that guides the current fluctuation position displayed at the current fluctuation position display step to one of the optimal fluctuation period and the optimal range if the current fluctuation position is different from one of the optimal fluctuation period and the optimal range displayed at the optimal fluctuation period and optimal range display step.

4. The monitoring method for monitoring a rotation speed of a rotary shaft in a machine tool according to claim 2, further comprising a step of:

displaying a guidance display that guides the current fluctuation position displayed at the current fluctuation position display step to one of the optimal fluctuation period and the optimal range if the current fluctuation position is different from one of the optimal fluctuation period and the optimal range displayed at the optimal fluctuation period and optimal range display step.

5. A monitor apparatus for monitoring a rotation speed of a rotary shaft in a machine tool, the machine tool including the rotary shaft that is mounted with one of a tool and a workpiece and driven by a motor, and a rotation speed fluctuating unit that continuously fluctuates the rotation speed of the rotary shaft at an arbitrary pattern, and a fluctuating condition of the rotation speed caused by the rotation speed fluctuating unit is monitored on a display section, the monitor apparatus comprising:

a fluctuation diagram display unit that generates and displays a fluctuation diagram that shows the relationship between a fluctuation amplitude and a fluctuation period for the rotation speed on the display section;

a current fluctuation position display unit that displays a current fluctuation position on the fluctuation diagram;

a settable range display unit that determines and displays a settable range for the fluctuation amplitude and the fluctuation period on the fluctuation diagram; and an optimal fluctuation period and optimal range display unit that determines and displays on the fluctuation diagram at least one of an optimal fluctuation period based on Equation (1) and an optimal range of the fluctuation period based on Equation (2), wherein $$P_O = aT \quad (1)$$

, and $$a_{min}T \leq P_I \leq a_{max}T \quad (2)$$

where,
$P_O$: optimal fluctuation period [s],
$P_I$: optimal range of fluctuation period [s],
T: rotation period of rotary shaft [s], and
a, $a_{min}$, $a_{max}$: preset coefficients, wherein an operator changes the fluctuation period of the rotary shaft to one of the optimal fluctuation period and a fluctuation period value within the optimal range of the fluctuation period to suppress regenerative chatter vibration.

6. The monitor apparatus for monitoring a rotation speed of a rotary shaft in a machine tool according to claim 5, wherein the settable range display unit displays a range enclosed by a power limit line of the motor for the fluctuation period and a preset upper limit line for the fluctuation amplitude as the settable range for the fluctuation amplitude and the fluctuation period.

7. The monitor apparatus for monitoring a rotation speed of a rotary shaft in a machine tool according to claim 5, further comprising:

a guidance display unit that displays a guidance display that guides the current fluctuation position displayed by the current fluctuation position display unit to one of the optimal fluctuation period and the optimal range if the current fluctuation position is different from one of the optimal fluctuation period and the optimal range displayed by the optimal fluctuation period and optimal range display unit.

8. The monitor apparatus for monitoring a rotation speed of a rotary shaft in a machine tool according to claim 6, further comprising:

a guidance display unit that displays a guidance display that guides the current fluctuation position displayed by the current fluctuation position display unit to one of the optimal fluctuation period and the optimal range if the current fluctuation position is different from one of the optimal fluctuation period and the optimal range displayed by the optimal fluctuation period and optimal range display unit.

9. A machine tool comprising:
a rotary shaft that is mounted with one of a tool and a workpiece and driven by a motor;
a rotation speed fluctuating unit that continuously fluctuates a rotation speed of the rotary shaft at an arbitrary pattern; and
the monitor apparatus according to claim 5.

10. A machine tool comprising:
a rotary shaft that is mounted with one of a tool and a workpiece and driven by a motor;
a rotation speed fluctuating unit that continuously fluctuates a rotation speed of the rotary shaft at an arbitrary pattern; and
the monitor apparatus according to claim 6.

11. A machine tool comprising:
a rotary shaft that is mounted with one of a tool and a workpiece and driven by a motor;
a rotation speed fluctuating unit that continuously fluctuates a rotation speed of the rotary shaft at an arbitrary pattern; and
the monitor apparatus according to claim 7.

12. A machine tool comprising:
a rotary shaft that is mounted with one of a tool and a workpiece and driven by a motor;
a rotation speed fluctuating unit that continuously fluctuates a rotation speed of the rotary shaft at an arbitrary pattern; and
the monitor apparatus according to claim 8.

* * * * *